US012774871B2

(12) United States Patent
Nelson et al.

(10) Patent No.: US 12,774,871 B2
(45) Date of Patent: Oct. 27, 2026

(54) ADDRESSABLE VERTICAL-CAVITY SURFACE-EMITTING LASER FOR AIMING AND POINTING BEAMS

(71) Applicant: B.E. Meyers & Co., Inc., Redmond, WA (US)

(72) Inventors: Spencer Nelson, Kirkland, WA (US); Miles Elledge, Woodinville, WA (US); Alexander Bigby, Redmond, WA (US); Thomas Alldredge, Clinton, WA (US)

(73) Assignee: B.E. Meyers & Co., Inc., Redmond, WA (US)

( * ) Notice: Subject to any disclaimer, the term of this patent is extended or adjusted under 35 U.S.C. 154(b) by 14 days.

(21) Appl. No.: 18/828,353

(22) Filed: Sep. 9, 2024

(65) Prior Publication Data

US 2026/0071846 A1 Mar. 12, 2026

(51) Int. Cl.
*F41G 1/34* (2006.01)
*G05D 3/20* (2006.01)
*H01S 3/101* (2006.01)

(52) U.S. Cl.
CPC ................. *F41G 1/34* (2013.01); *G05D 3/20* (2013.01); *H01S 3/101* (2013.01)

(58) Field of Classification Search
CPC .............. F41G 1/34; G05D 3/20; H01S 3/101
See application file for complete search history.

(56) References Cited

U.S. PATENT DOCUMENTS

| | | | |
|---|---|---|---|
| 8,347,543 B1 | 1/2013 | Smith | |
| 9,062,933 B1 | 6/2015 | Allen et al. | |
| 9,335,122 B2 | 5/2016 | Choiniere | |
| 10,107,592 B1 | 10/2018 | Huang et al. | |
| 10,955,218 B1 | 3/2021 | Drake | |
| 11,009,315 B1 | 5/2021 | Huang et al. | |
| 12,123,589 B1 * | 10/2024 | Tsur | F21V 5/004 |
| 2012/0198748 A1 | 8/2012 | Ospino Orozco | |

(Continued)

FOREIGN PATENT DOCUMENTS

| | | |
|---|---|---|
| CA | 2 996 381 A1 | 3/2017 |
| CN | 111313236 A | 6/2020 |

(Continued)

OTHER PUBLICATIONS

International Preliminary Report on Patentability for PCT Application No. PCT/US2023/012405 mailed Aug. 22, 2024, 12 pages.

(Continued)

*Primary Examiner* — Matthew Mikels

(74) *Attorney, Agent, or Firm* — Amin, Turocy & Watson, LLP

(57) ABSTRACT

A system includes a vertical-cavity surface-emitting laser (VCSEL) die that includes individually addressable VCSEL elements, the individually addressable VCSEL elements respectively including one or more lasing segments etched into the VCSEL die; a controller that designates a selected VCSEL element, of the individually addressable VCSEL elements of the VCSEL die, based on a spatial pattern to be projected from the system in a downfield direction toward a target; and a driver system that selectively applies a drive signal to the selected VCSEL element in response to the selected VCSEL element being designated by the controller.

20 Claims, 11 Drawing Sheets

(56) References Cited

U.S. PATENT DOCUMENTS

| | | | | |
|---|---|---|---|---|
| 2013/0235609 | A1 | 9/2013 | Nemeyer | |
| 2013/0286216 | A1 | 10/2013 | Lupher et al. | |
| 2014/0215876 | A1 | 8/2014 | Popa-Simil | |
| 2015/0176949 | A1 | 6/2015 | Varshneya et al. | |
| 2016/0377378 | A1 | 12/2016 | Collin | |
| 2017/0357002 | A1 | 12/2017 | Winker et al. | |
| 2019/0006819 | A1 | 1/2019 | Joseph | |
| 2019/0145733 | A1 | 5/2019 | Chung | |
| 2019/0293388 | A1 | 9/2019 | Barrett et al. | |
| 2021/0247165 | A1 | 8/2021 | Tello | |
| 2021/0348886 | A1 | 11/2021 | Havens et al. | |
| 2023/0228531 | A1* | 7/2023 | Bigby | F41G 1/35 42/117 |

FOREIGN PATENT DOCUMENTS

| | | | |
|---|---|---|---|
| CN | 115173231 | A | 10/2022 |
| DE | 20 2015 100 438 | U1 | 5/2016 |
| WO | 2015/027100 | A1 | 2/2015 |
| WO | 2023/183092 | A2 | 9/2023 |

OTHER PUBLICATIONS

European Office Action mailed Sep. 17, 2024 for European Patent Application No. 23775428.8, 3 pages.

Non-Final Office Action received for U.S. Appl. No. 18/836,639 dated Jul. 7, 2025, 15 pages.

Notice of Allowance received for U.S. Appl. No. 18/836,639 dated Oct. 15, 2025, 8 pages.

Extended European Search Report received for European Patent Application Serial No. 23775428.8 dated Dec. 22, 2025, 9 pages.

International Search Report and Written Opinion for PCT Application No. PCT/US2023/012405 mailed Oct. 10, 2023, 14 pages.

Communication Pursuant to Rule 70(2) and 70a(2) EPC received for EP Patent Application Serial No. 23775428.8 dated Jan. 12, 2026, 1 page.

Partial European Search Report received for European Patent Application Serial No. 25201051.7 dated Jan. 26, 2026, 26 pages.

Extended European Search Report received for European Patent Application Serial No. 25201051.7 dated Apr. 16, 2026, 23 pages.

* cited by examiner

ADDRESSABLE VERTICAL-CAVITY SURFACE-EMITTING LASER FOR AIMING AND POINTING BEAMS

BACKGROUND

A laser optics system, such as for a firearm or other similar device, can utilize a vertical-cavity surface emitting-laser (VCSEL) or other laser device to project a beam, e.g., a visible light beam, an infrared (IR) beam, etc., which can be used for purposes such as pointing, firearm aiming, or the like. With regard to these laser optics systems, it would be desirable to improve upon such systems in order to increase the information available to an operator of the optics system and/or other nearby personnel.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include a vertical-cavity surface-emitting laser (VCSEL) die that includes individually addressable VCSEL elements, the individually addressable VCSEL elements respectively including one or more lasing segments etched into the VCSEL die. The system can further include a controller that designates a selected VCSEL element, of the individually addressable VCSEL elements of the VCSEL die, based on a spatial pattern to be projected from the system in a downfield direction toward a target. The system can also include a driver system that selectively applies a drive signal to the selected VCSEL element in response to the selected VCSEL element being designated by the controller.

In another implementation, a method is described herein. The method can include selecting, by a system including at least one processor, one or more elements from elements of a VCSEL die based on a lasing pattern to be emitted from the VCSEL die toward a downfield target, resulting in one or more selected elements of the VCSEL die. The elements of the VCSEL die can respectively include one or more lasing segments etched into the VCSEL die. The method can additionally include driving, by the system, the one or more selected elements of the VCSEL die in response to the selecting, resulting in the VCSEL die emitting the lasing pattern.

In an additional implementation, another system is described herein. The system can include a controller that selectively activates a first element of a VCSEL array based on first pattern data representative of a first pattern to be projected toward a target. The system can further include an adjustment unit that generates second pattern data, representative of a second pattern to be projected toward the target, based on observed change to one or more properties selected from a group of properties including a first property of the target and a second property of an environment in which the target is located. The controller, in response to the adjustment unit generating the second pattern data, can then deactivate the first element of the VCSEL array and selectively activate a second element of the VCSEL array based on the second pattern data, where the second element is different from the first element.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter. Additionally, it is noted that the drawings are not drawn to scale, either within the same drawing or between different drawings.

Implementations described herein facilitate the use of vertical-cavity surface-emitting laser (VCSEL) technology to project configurable patterns. For instance, a VCSEL device as described herein can be used to project a firearm reticle or other pattern in a downfield direction, e.g., toward a target, that is capable of adjustment in real time to indicate an adjusted aiming point that can account for factors such as target movement speed, wind velocity, spin drift, and/or other suitable factors. Also or alternatively, implementations described herein can facilitate projection of a measurement assistance pattern that can enable assisted, or automatic, measurement of far-field objects in one or more dimensions. Still other implementations described herein can facilitate projection of other patterns, such as text messages or the like, by selectively driving elements of a VCSEL array without the use of large optics generally associated with projector systems.

While various examples are provided herein with reference to infrared (IR) illumination, it is noted that these examples are provided merely for purposes of description and that similar concepts to those described herein could be utilized to facilitate illumination using any suitable light wavelength(s), e.g., visible light, etc., without departing from the scope of this description or the claimed subject matter.

Figure 1A:
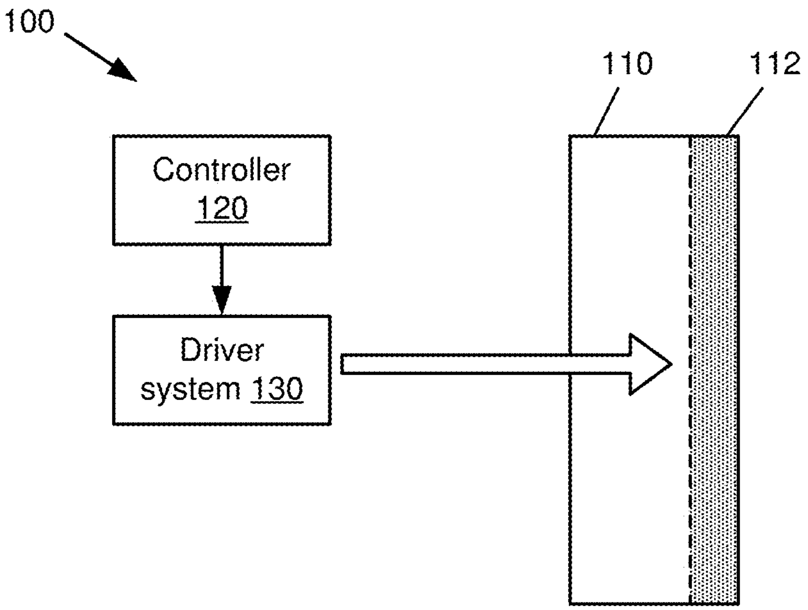
FIG. 1A is a block diagram of a system that facilitates generation of aiming or pointing beams using a vertical-cavity surface-emitting laser (VCSEL) device in accordance with various implementations described herein.

With reference now to the drawings, FIG. 1A illustrates a system 100 that facilitates generation of aiming or pointing beams using an addressable VCSEL device in accordance with various implementations described herein. System 100 as shown in FIG. 1A includes a VCSEL die 110 that is oriented such that an emission surface 112 of the VCSEL die 110, which can include one or more VCSEL elements as will be described in further detail below, is positioned in an outward direction with respect to system 100 to form an optical path running from the VCSEL die 110 towards a far-field target, object, surface, etc. While the VCSEL die 110 shown in FIG. 1A includes only a single emission surface 112, it is noted that a VCSEL die 110 can have more than one emission surface 112 in some implementations, and these multiple emission surfaces could be in the same or different planes.

Figure 1B:
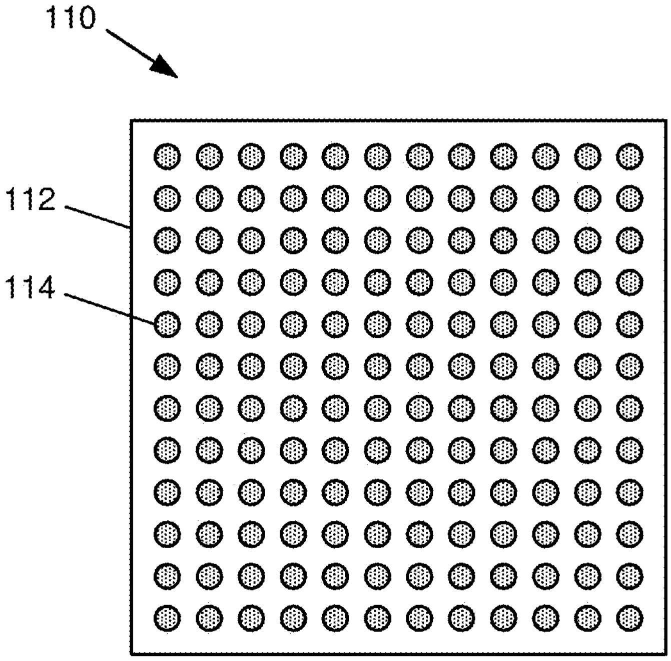
FIG. 1B is a front view of the example VCSEL die shown in FIG. 1A.

A front view of the VCSEL die 110 of system 100 is shown in FIG. 1B, which further depicts a non-limiting example layout for the emission surface 112. As shown in FIG. 1B, the VCSEL die 110 can include respective individually addressable VCSEL elements 114, which can be placed in any number and/or arrangement on the emission surface 112 of the VCSEL die 110. In the example shown in FIG. 1B, each VCSEL element 114 is composed of one lasing segment, here a circular lasing segment, that is etched into the emission surface 112 of the VCSEL die 110 to enable photonic emission from the emission surface 112. In some implementations, a VCSEL element 114 could alternatively be composed of multiple lasing segments that are physically wired together (e.g., with traces) such that when the traces connecting the lasing segments are energized, each lasing segment of the VCSEL element 114 emits.

It is also noted that, while FIG. 1B illustrates circular lasing segments, respective lasing segments formed into the emission surface 112 of the VCSEL die 110 could be of any suitable shape. A non-limiting example of non-circular lasing segments is described in further detail below with respect to FIG. 10. It is further noted that lasing segments of multiple shapes could be etched into a single VCSEL die 110 in some implementations. Only one VCSEL element 114 is labeled in FIG. 1B for simplicity of illustration, but it is noted that other lasing segments shown in FIG. 1B, or respective combinations of the lasing segments shown in FIG. 1B, could also be VCSEL elements 114. It is also noted that the emitter pattern shown in FIG. 1B is merely one example of a pattern that can be utilized and that other patterns can also be used.

While FIGS. 1A-1B illustrate a single VCSEL die 110, it is noted that configurations of multiple VCSEL dies could also be used. By way of a non-limiting example, four VCSEL dies could be used, each corresponding to a quadrant of an overall illumination system. Other configurations could also be used that could include any number of VCSEL dies (e.g., four VCSEL dies, five VCSEL dies, six VCSEL dies, eight VCSEL dies, etc.) which could be arranged with respect to each other in any suitable manner, e.g., a rectilinear or radial array of VCSEL dies or VCSEL elements, and/or according to any other suitable spatial arrangement.

System 100 as shown in FIG. 1A also includes a controller 120 that can designate one or more selected emitter elements, of the individually addressable VCSEL elements 114 of the VCSEL die 110, based on a spatial pattern to be projected from system 100 in a downfield direction toward a target. In one implementation, the emitter elements 114 of the VCSEL die 110 can be considered by the controller 120 as elements of an array that can be individually addressed to selectively operate respective elements of the array independently of each other. Various examples of spatial patterns that can serve as a basis for operation of the controller are described in further detail below, e.g., with respect to FIGS. 3-5, 9, and 12-13.

While not shown in FIG. 1A for simplicity of illustration, the controller 120 can be implemented as a computing device, e.g., an embedded computer, etc., that can include a memory (e.g., an instruction memory, etc.) on which computer-executable instructions are stored and a processor that can execute the stored instructions, e.g., to facilitate a selection of VCSEL elements 114 and/or to facilitate other operations. The controller 120 can also include and/or interface with other devices, such as manual input devices (e.g., a knob or dial, a keypad, etc.) that facilitate entry of a selection input corresponding to a desired functionality of system 100. Also, or alternatively, illumination sensors, automatic feedback systems, and/or other devices can provide additional input to the controller 120 based on various factors. It is noted that, in some implementations, devices with which the controller 120 can interact can include devices external to system 100 that can be communicatively coupled to system 100 via any suitable wired or wireless communication technologies. An example computing architecture that can be utilized to implement the controller 120 and/or facilitate interaction between the controller 120 and one or more ancillary devices is described in further detail below with respect to FIG. 6.

As additionally shown in FIG. 1A, system 100 includes a driver system 130 that can selectively apply a drive signal to the VCSEL element(s) 114 selected by the controller 120 as described above, e.g., in response to the VCSEL element(s) 114 being designated as selected VCSEL element(s) by the controller 120. While the controller 120 and the driver system 130 are illustrated as separate blocks in FIG. 1 to highlight the functionality of the respective blocks, it is noted that the controller 120 and driver system 130 could, in some implementations, be implemented via common hardware. The drive signal provided by the driver system 130 can be any signal, such as a fixed width signal, a pulse width modulated (PWM) signal or other alternating signal, or the like, that is suitable for energizing respective VCSEL elements 114 such that the VCSEL elements 114 emit light in response to the drive signal.

In an implementation, respective VCSEL elements 114 of the VCSEL die 110 can be electrically coupled to the driver system 130 via wires, leads, traces, and/or other appropriate means. In response to the controller 120 designating one or more selected VCSEL elements, the driver system 130 can provide a drive signal by applying current to the selected VCSEL element(s) via the electrical coupling(s) between the driver system 130 and the VCSEL elements 114. These electrical couplings can be placed on the emission surface 112 of the VCSEL die 110, e.g., in a manner such that the electrical couplings do not overlap with each other or with any lasing segments that make up the respective VCSEL elements 114. Alternatively, the electrical couplings could run from off the surface of the VCSEL die 110, through an interior of the VCSEL die 110, e.g., via a multilayer die process, and/or in any other suitable manner.

With additional reference to FIG. 1B, the VCSEL elements 114 can be composed of laser cavities, e.g., segments, that can be etched and/or otherwise placed into the emission surface 112 of the VCSEL die 110, where each of the laser cavities operate as a lasing segment within a VCSEL array and groups of one or more lasing segments form the VCSEL elements 114. While circular VCSEL elements 114 are shown in FIG. 1B, it is noted that cavity patterns corresponding to a given emitter configuration can include point cavities, stripe cavities, and/or laser cavities in any suitable shape that can define extents of respective boundaries from which photons are emitted from the VCSEL die 110.

In response to a given VCSEL element 114 being driven and/or otherwise enabled (e.g., by the controller 120 and/or driver system 130), light produced by the lasing segment(s) making up the VCSEL element 114 will be bounded by the boundaries of the respective segment(s). Moreover, segment shapes can correspond to photoemission characteristics, such that for a given drive condition, differently shaped segments can emit different amounts of photons, different concentrations of photons per unit area, different uniformities of photon emission, etc. In this regard, VCSEL die patterning of segments, at the design stage, can employ segment shape designs that can provide particular advantages once deployed in the field.

In some implementations, the controller 120 and/or driver system 130 shown in FIG. 1A can vary the electrical drive provided to the VCSEL die 110. For example, respective elements of a VCSEL die 110 can be driven with a constant input current that results in an output power at a given divergence. The drive current of the VCSEL could also be produced via pulse width modulation (PWM) and/or other techniques which can result in lasing in an efficient drive current regime at each example pulse (of the PWM) but causing average illumination levels that can be reduced in comparison to driving the lasing at the same current in a constant current mode. As an example, a lasing segment of a VCSEL element can lase more efficiently at a first current than at a second current. In this example, the level of illumination desired can be less than that produced by the lasing segment if its corresponding VCSEL element is driven at the first current in a constant current mode. Accordingly, in this example, the VCSEL element can be driven at the second current to achieve the desired illumination at the cost of operating less efficiently. This can be less desirable, especially where the VCSEL may be driven by a battery power source and high efficiency can be desirable. As such, rather than driving at the second current, the VCSEL element can be driven, in this example, in a PWM scheme at the first current allowing for efficient lasing while also allowing for the average illumination to be reduced based on the duty cycle of the PWM driving scheme.

Thus, in one example in which a drive signal produced by the driver system 130 of FIG. 1A is a PWM signal, the driver system 130 can set a duty cycle, and/or other properties of the signal, based on the target beam width to be provided via the VCSEL die 110. This can reduce the variance in the total amount of power usage by the system resulting from changes to the target beam width, e.g., as achieved by enabling or disabling varying amounts of emitters associated with the VCSEL die 110. In addition to reducing the total amount of power consumption, varying the duty cycle of a drive signal in this manner can also be used to stabilize the VCSEL die 110 over temperature, e.g., to obtain average output power that exhibits less output power variation due to temperature and with less temperature variance than that associated with a continuous wave input at lower power output levels.

Also or alternatively, the duty cycle of a drive signal can be varied in order to vary the total amount of power provided to the VCSEL die 110, e.g., to adjust the brightness of illumination produced by the VCSEL die 110, while keeping the VCSEL die 110 within its rated output power. By way of non-limiting example, a given VCSEL can operate most efficiently at a power level that is a percentage of its rated output power, e.g., between 60 to 100 percent of the rated output power. Accordingly, if a power level that is less than this efficiency level is desired, a drive signal can be provided to the VCSEL at the efficiency level and modified via PWM and/or other techniques such that an average power level provided to the VCSEL is the desired amount. In addition to modifying a drive signal provided to the entire VCSEL using PWM or the like, power levels provided to individual emitter elements, or individual segments within emitter elements, could also be modified, e.g., to cause some emitter elements and/or segments to be brighter or dimmer than others.

Figure 2:
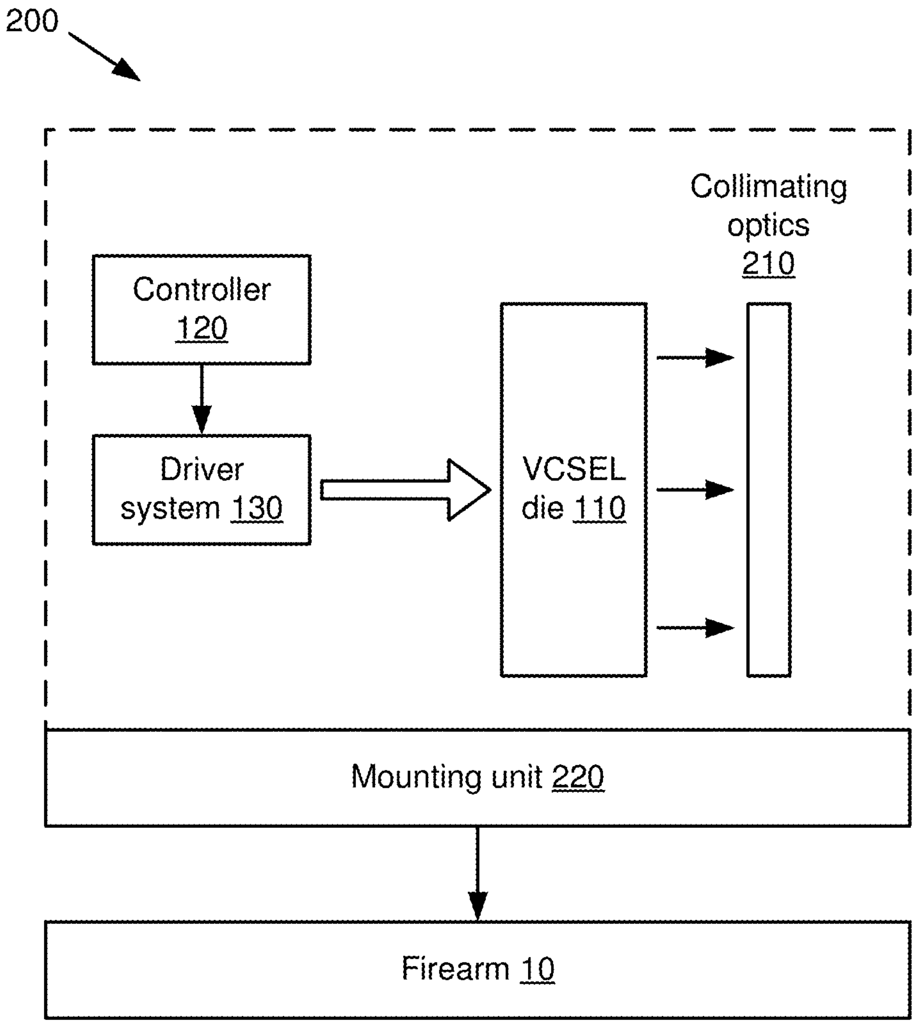
FIG. 2 is a block diagram of a system that facilitates integration of a VCSEL device with a firearm in accordance with various implementations described herein.

With reference next to FIG. 2, a system 200 that facilitates integration of a VCSEL device with a firearm 10 in accordance with various implementations described herein is illustrated. Repetitive description of like elements that are employed in other embodiments described herein is omitted for brevity. System 200 as shown in FIG. 2 includes a VCSEL die 110, a controller 120, and a driver system 130 that can function as described above with respect to FIG. 1A and/or with respect to other implementations provided herein. In addition, system 200 as shown in FIG. 2 includes collimating optics 210, which can include one or more lenses, diffuser elements, and/or other components that shape light emitted by the VCSEL die 110 in a manner that facilitates consistency of images projected by the VCSEL die 110 with distance. As shown in FIG. 2, the VCSEL die 110 can be positioned perpendicular to an optical axis of a lens of the collimating optics 210, which can define an optical path running from the VCSEL die 110 through the collimating optics 210 and toward a far-field target.

In an implementation, the collimating optics 210 can include a lens of a given focal length that is associated with an angular spacing between beams projected from respective VCSEL elements 114 of the VCSEL die 110, e.g., as described above with respect to FIG. 1B. More particularly, non-limiting example, the focal length of the lens can be a defined multiple of the distance between respective VCSEL elements 114, which can result in the VCSEL elements 114 projecting light, e.g., via their respective lasing segments, at uniform intervals in angular space. By way of specific, non-limiting example, a lens having a focal length that is 1000 times the spacing between VCSEL elements (e.g., a 25 mm focal length lens and VCSEL elements spaced 25 microns apart) can cause the respective VCSEL elements to project light at 1 milliradian intervals. Other focal lengths and element spacing schemes could also be used to facilitate other angular intervals as appropriate. As a result, light emitted by respective elements of the VCSEL die 110 can occupy non-overlapping areas in the far field that are physically spaced apart at consistent intervals, e.g., spatial intervals that vary as a function of the distance to the target, as will be described in further detail with respect to FIGS. 10-12.

In various implementations, lenses and/or other elements of the collimating optics 210 can be fixed within system 200 such that manual focusing of the collimating optics 210 need not be performed. In other implementations, system 200 could include control devices, such as knobs, dials, or the like, that facilitate adjustment of the positioning of the collimating optics 210 relative to the VCSEL die 110 for fine tuning focus.

As further shown in FIG. 2, system 200 can include a mounting unit 220 that can facilitate mounting of system 200 and/or one or more of its components to a firearm 10 or other device. By way of example, the mounting unit 220 can facilitate connection of system 200 to a rail system of the firearm 10, such as a 1913 Picatinny rail system, a NATO (North Atlantic Treaty Organization) Accessory Rail (NAR) system, or any other suitable rail system(s). Also or alternatively, the mounting unit 220 can include clamps or other physical devices that facilitate attachment of system 200 to a body of the firearm 10. Other structures of the mounting unit 220 could also be used.

Returning to FIG. 1B, the emission surface 112 of the VCSEL die 110 can have an array of VCSEL elements 114, which can be selectively driven individually and/or in groups by the controller 120 and driver system 130 shown in FIG. 1A. In the example shown in FIG. 1B, a 12×12 rectilinear array of VCSEL elements 114 is shown; however, it is noted that other array sizes (e.g., 15×15, 30×30, 100×100, etc.), as well as other array configurations (e.g., a polar array, etc.) could also be used for a given implementation.

The VCSEL die 110 can be used to project patterns, e.g., by selecting respective ones of the VCSEL elements 114 corresponding to the desired pattern. To this end, in some implementations, each of the VCSEL elements 114 can be individually addressable, e.g., by attaching each individual element 114 to a separate lead that can be addressed by the controller 120 and driven by the driver system 130. Alternatively, the driver system 130 can include a row driver (or column driver) that can be utilized to address a row (or column) of the VCSEL elements 114, e.g., via common leads connected to each row (or column) of the array, and individual elements 114 within a given row (or column) of the array can then be cycled in time and/or otherwise distinguished from each other to facilitate energizing or de-energizing the elements 114 without individual leads associated with each element. As still another example, the driver system 130 could include both a row driver and a column driver that interface with common leads connected to each row and column of the array, respectively, and the controller 120 and driver system 130 can energize or de-energize individual elements 114 based on the intersection of row and column signals. Other techniques could also be used.

Figure 3:
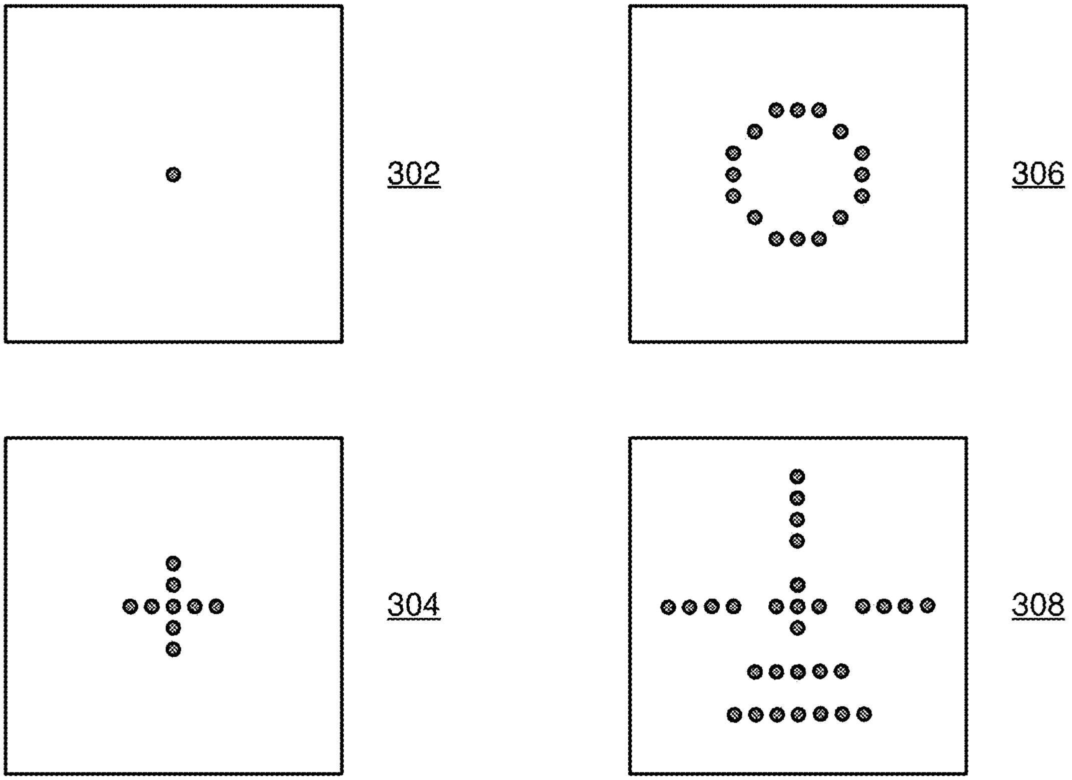
FIGS. 3-5 are diagrams depicting respective illumination patterns that can be produced by a VCSEL device in accordance with various implementations described herein.

In one example implementation, elements 114 of the VCSEL die 110 shown in FIG. 1B can be selectively activated or deactivated to facilitate display of a reticle pattern, e.g., a pattern fashioned into the shape of a reticle that assists aiming of a firearm, e.g., a firearm 10 onto which the VCSEL die 110 is mounted (e.g., via a mounting unit 220 as described above with respect to FIG. 2). Example reticle patterns that can be projected in this manner are illustrated by FIG. 3, including a dot pattern 302, a cross pattern 304, a circle pattern 306, and a "Christmas tree" reticle pattern 308. It is noted, however, that the patterns shown in FIG. 3 are not intended as an exhaustive listing and that other reticle patterns could also be used.

In each of the patterns shown in FIG. 3, the individual circular elements can correspond to a VCSEL element 114, e.g., a VCSEL element 114 as shown by FIG. 1B, that is selected and energized, e.g., by a controller 120 and driver system 130 as shown in FIG. 1A. Stated another way, by selectively activating and deactivating respective VCSEL elements 114, a controller 120 and driver system 130 can facilitate display of the patterns shown in FIG. 3 and/or other suitable patterns, e.g., such as those that will be described in further detail below.

In various implementations, a given reticle pattern can be chosen for projection based on factors such as a type of firearm associated with the reticle (e.g., shotgun, rifle, etc.) and/or an expected amount of projectile spread associated with the firearm. Thus, for example, a low-spread firearm such as a rifle can utilize a dot pattern 302 or cross pattern 304, while a high-spread firearm such as a shotgun can utilize a circle pattern 306. As another example, a reticle pattern can be selected based on a measured or estimated distance to the target, e.g., as given by a rangefinder system or the like. For instance, a circle pattern 306 could be used at a comparatively large distance (e.g., greater than 500 meters, etc.), a reticle pattern 308 could be used for comparatively mid-range distances (e.g., between 100-500 meters, etc.), and a dot pattern 302 or cross pattern 304 could be used for comparatively short distances (e.g., less than 100 meters, etc.). It is noted that the given distances are intended merely as examples and that other distance ranges could also be used.

In still other implementations, the position of the reticle pattern could be adjusted or "digitally shifted," e.g., by activating different VCSEL elements 114 to cause the reticle pattern to appear to move relative to the optical axis of the VCSEL die 110. This can be based on proximity to a given target, e.g., such that the position of the reticle pattern is shifted at given distance ranges, or alternatively shifting of the reticle pattern can be performed to facilitate aiming the firearm at an adjusted aiming point (as compared to a zeroed aiming point of the firearm), as will be described in further detail below with respect to FIGS. 7-9.

Figure 4:
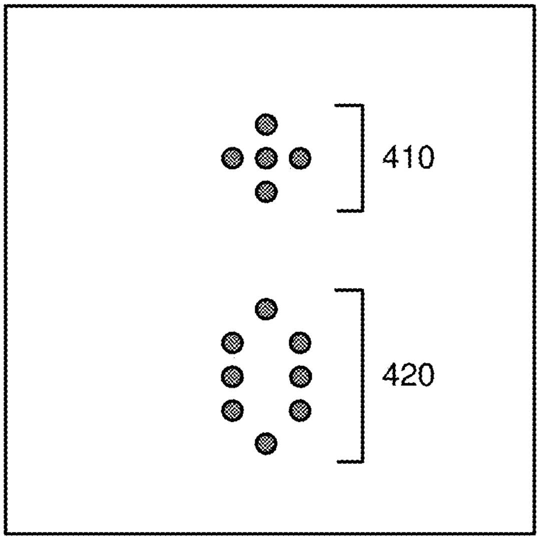

In an additional implementation as shown by FIG. 4, multiple reticle patterns or other patterns can be displayed simultaneously, e.g., by selectively energizing VCSEL elements corresponding to each respective pattern. FIG. 4 illustrates an example of a projected spatial pattern that includes a first reticle pattern 410 that can assist aiming a weapon such as a firearm to which the VCSEL device is mounted as well as a second reticle pattern 420 that can assist aiming a secondary weapon, such as a grenade launcher or other weapon that is mounted to a primary weapon associated with the first reticle pattern 410. It is noted, however, that the reticle patterns 410, 420 shown in FIG. 4 could, in some examples, be associated with weapons that are physically separate, or even weapons that are operated by different users. For instance, the first reticle pattern 410 could correspond to a weapon operated by a user of the system, and the second reticle pattern 420 could correspond to another weapon operated by another user that is within line of sight of the projected spatial pattern, e.g., such that the second reticle pattern 420 is visible to the other user via night vision goggles and/or other equipment associated with that user.

In an implementation in which weapons corresponding to the reticle patterns 410, 420 shown in FIG. 4 are not physically attached to each other, the second reticle pattern 420 could be communicatively coupled to the VCSEL device, or another weapon coupled to the VCSEL device, to relay information corresponding to the position and/or orientation of the weapon corresponding to the second reticle pattern 420, e.g., in order to enable the second reticle pattern 420 to be accurately positioned relative to the first reticle pattern 410. Alternatively, the second reticle pattern 420 could correspond to reference points for the operator of the associated weapon, e.g., to facilitate adjusting aiming of the weapon relative to a zeroed aiming point given by optics associated with the weapon.

In some implementations, reticle patterns associated with different weapons, users, etc., can be given unique shapes, sizes, and/or light wavelengths/colors to enable identification of an operator in the field by the unique appearance of their reticle pattern. Also or alternatively, reticle patterns associated with different weapons and/or operators could utilize unique pulse patterns to enable similar identification in the field. These modifications could apply to scenarios in which a single VCSEL device projects multiple patterns, such as that shown by FIG. 4, and/or scenarios in which multiple users each project one or more patterns from their own VCSEL device.

Figure 5:
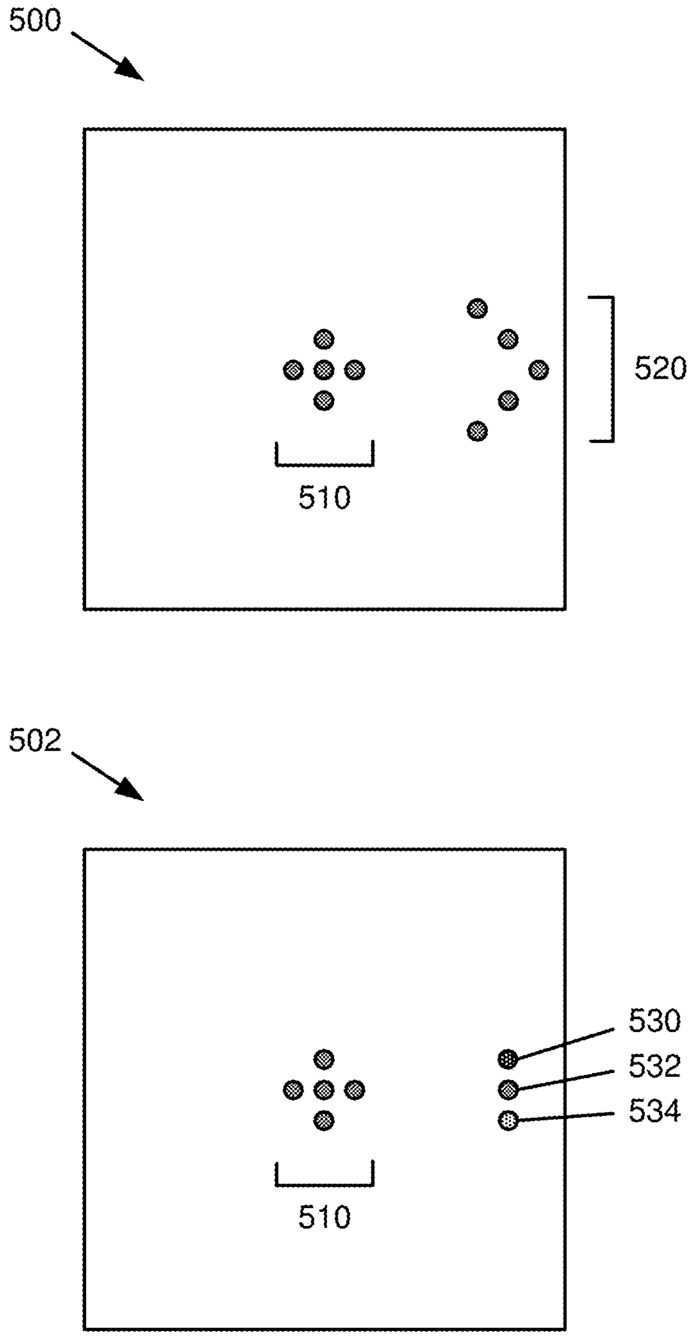

In still other implementations, a reticle pattern or other pattern projected from a VCSEL device as described herein can be augmented with additional information, such as an indication of target movement, as shown by FIG. 5. More particularly, diagrams 500 and 502 provide respective examples of a movement indicator that can be displayed in addition to a reticle pattern 510 to provide information regarding the movement of a target, e.g., a target located at or near a position of the reticle pattern, as determined based on imaging data captured of the target and/or other suitable information indicative of movement of the target.

Diagram 500 shows an example of a movement indicator 520 that can be used for on-plane target movement, e.g., movement lateral to the VCSEL device (e.g., left or right), changes to target elevation (e.g., a drone ascending or descending), etc. In the example shown by diagram 500, the movement indicator 520 is in the shape of a right arrow on the right side of the array space, indicating that the target is moving right relative to the position of the reticle pattern 510. The orientation and/or position of the movement indicator 520 could vary based on detected movement, e.g., an upward arrow at the top of the array space for an ascending target, etc.

Diagram 502 shows an example of elements 530, 532, 534 of a movement indicator that can be used for movement toward or away from the VCSEL device. The elements 530, 532, 534 can be activated and deactivated in sequence to indicate a direction of the target movement. For example, movement toward the VCSEL device could be indicated by a repeating pattern of first activating element 530, then deactivating element 530 and activating element 532, then deactivating element 532 and activating element 534. Animation of this pattern in the opposite direction, i.e., activating element 534, then element 532, then element 530, could be used to indicate movement away from the VCSEL device.

In some implementations, an animating movement indicator as shown in diagram 502 could also be used to indicate lateral target movement in addition to, or in place of, movement toward or away from the VCSEL device. Also or alternatively, the movement indicators shown in diagrams 500 and 502 could be combined, e.g., to denote movement of a target in multiple axes simultaneously. It is noted that other patterns indicating target movement of any type could also be used in addition to, or in place of, the patterns shown in FIG. 5.

Figure 6:
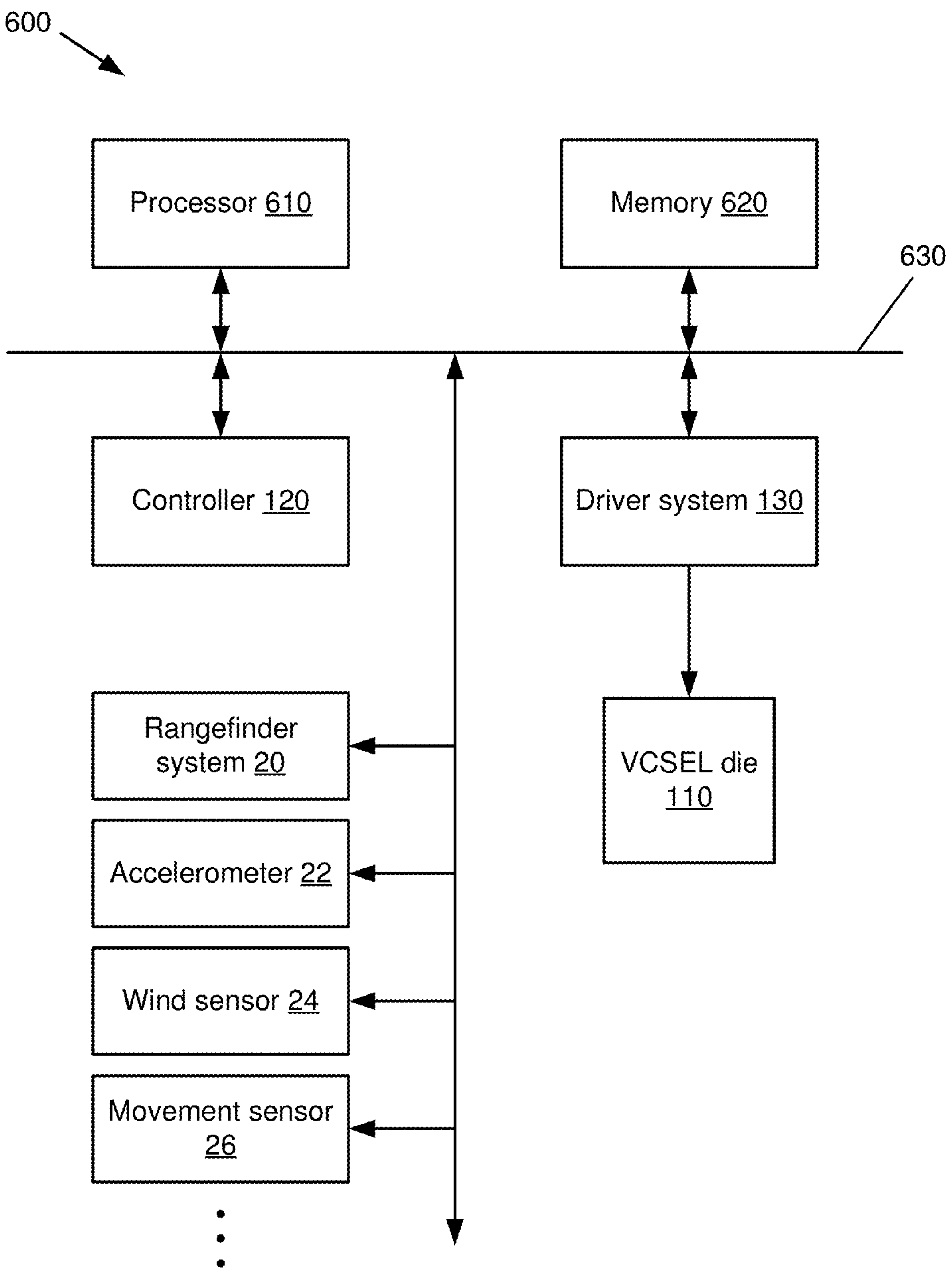
FIG. 6 is a simplified block diagram of an example VCSEL system in which various implementations described herein can operate.

Turning now to FIG. 6, an example VCSEL system 600 in which various implementations described herein can operate is illustrated. Repetitive description of like elements that are employed in other embodiments described herein is omitted for brevity. System 600 as shown in FIG. 6 includes a processor 610 and a memory 620, which can be utilized to implement at least a portion of the functionality of the controller 120, the driver system 130, and/or one or more other components or devices as described herein. For instance, the memory 620 can include one or more data storage devices onto which computer-executable instructions can be stored, and the processor 610 can be operable to execute the instructions stored on the memory 620 to facilitate performance of operations. In some implementations, the processor 610 and memory 620 can be implemented as an embedded computer within an illuminator device that also includes the VCSEL die 110. In other implementations, the processor 610 and memory 620 could be implemented via a general-purpose computer and/or another suitable device that is separate from an illuminator device that includes the VCSEL die 110. Other implementations could also be used. It is also noted that while the controller 120 and driver system 130 are illustrated as separate blocks in FIG. 6, these components could, in some implementations, be fully implemented via the processor 610 and memory 620.

As further shown in FIG. 6, system 600 can include a bus 630 or other link that is operable to communicatively couple the respective components of system 600, such as the processor 610, memory 620, controller 120, and driver system 130. In addition, the bus 630 can facilitate coupling of one or more ancillary systems to system 600, such as a rangefinder system 20, an accelerometer 22, a wind sensor 24, a movement sensor 26, and/or other suitable systems. While not shown in FIG. 6 for clarity of illustration, system 600 could also include a dedicated communication interface that can facilitate interconnection of the elements of system 600 with one or more ancillary systems, such as those shown in FIG. 6, via the bus 630.

In various implementations, the controller 120, either independently or via the processor 610, can facilitate adjusting a pattern projected by the VCSEL die 110 via the driver system 130 based on input received from the ancillary systems shown in FIG. 6. By way of example, the rangefinder system 20 can determine a distance between the VCSEL die 110 and a far-field target, which can enable adjustment of a reticle pattern or other pattern, e.g., to account for an expected drop of a projectile in flight from system 600 to the target due to gravity and/or other factors. As another example, the accelerometer 22 can be used to determine an orientation of system 600 and/or objects (such as a firearm) associated with system 600, which can enable a pattern projected by the VCSEL die 110 to be moved (e.g., digitally shifted) to account for the detected orientation.

As another example, the wind sensor 24 can be used to measure a velocity of wind present at a location of system 600 and/or to measure or estimate a velocity of wind present at other locations, such as an area between system 600 (or an object such as a firearm that is associated with system 600) and a designated target, which can enable the controller 120 to adjust a projected reticle pattern to indicate an adjusted aiming point based on a zeroed aiming point and the wind velocity data.

As a further example, the movement sensor 26 can generate data representative of a movement speed of a designated target, e.g., based on radar or laser detection, image analysis, and/or other techniques. The controller 120 can then utilize this information to modify a pattern projected by the VCSEL die 110, e.g., by adjusting a projected reticle pattern to indicate an adjusted aiming point based on a zeroed aiming point and the movement speed data, and/or by providing target movement indicators in addition to (or in place of) a reticle pattern as described above with respect to FIG. 5.

It is noted that the ancillary systems shown in FIG. 6 are intended merely as a non-exhaustive listing of systems that can be utilized to supplement information available to the controller 120 and that other systems could also be used. For example, the controller 120 could also receive data from a positioning system, such as a Global Positioning System (GPS) receiver or the like, representative of a location of system 600, based on which the controller 120 could facilitate adjustment of a projected pattern based on estimated air density at a determined altitude of system 600, estimated spin drift or Coriolis effect associated with the determined location of system 600, and/or other suitable factors. Still other ancillary data could also be used.

Figure 7:
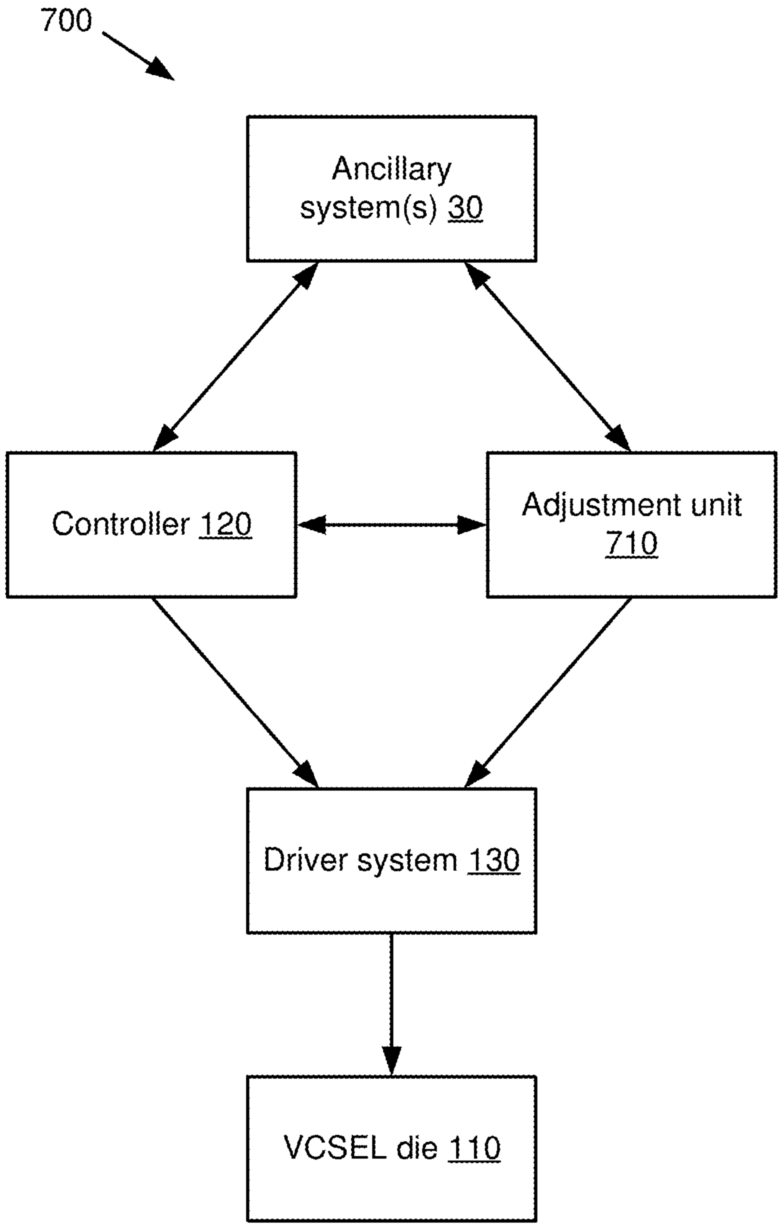
FIG. 7 is a block diagram of another system that facilitates generation of aiming or pointing beams using a VCSEL device in accordance with various implementations described herein.

With reference now to FIG. 7, another system 700 that facilitates generation of aiming or pointing beams using a VCSEL device is illustrated. Repetitive description of like elements that are employed in other embodiments described herein is omitted for brevity.

System 700 as shown in FIG. 7 includes a controller 120 that, along with a driver system 130, can selectively activate elements of a VCSEL array, e.g., an array of VCSEL elements respectively composed of lasing segments etched into an emission surface 112 of a VCSEL die 110, based on (first) pattern data representative of a (first) pattern (e.g., a reticle pattern or other pattern) to be projected toward a target.

As further shown in FIG. 7, system 700 includes an adjustment unit 710 that can generate alternate (second) pattern data, representative of a modified (second) pattern to be projected toward the target. In an implementation, the alternate pattern data can be generated by the adjustment unit 710 based on change to properties of the target or an environment in which the target is located as observed by the adjustment unit 710 and/or one or more ancillary systems 30 such as the systems described above with respect to FIG. 6 and/or other systems. In response to the adjustment unit 710 generating the alternate pattern data, the controller 120 can then deactivate the originally activated elements of the VCSEL array and selectively activate other elements, which may be the same as and/or different from the originally activated elements, based on the alternate pattern data.

While the controller 120 and adjustment unit 710 are illustrated as separate components in FIG. 7, it is noted that the controller 120 could, in some embodiments, implement some or all of the functionality of the adjustment unit 710. By way of example, the controller 120 described above with respect to FIG. 6 could, in some implementations, also serve as an adjustment unit 710 to facilitate modification of a projected pattern based on information received from and/or generated by other components of system 600 as shown in FIG. 6.

In one non-limiting implementation of system 700, the controller 120 can initially select elements of the VCSEL die 110 for activation based on a first reticle pattern or other spatial pattern that represents a zeroed aiming point of a firearm, i.e., an aiming point of a firearm determined via bore sighting and/or other suitable calibration techniques. Based on information received from the adjustment unit 710, the controller 120 can then designate alternative elements of the VCSEL die 110 based on a second reticle pattern or other spatial pattern that represents an adjusted aiming point of the firearm, e.g., to compensate for gravity, wind, target movement, and/or other factors.

In some implementations in which system 700 is associated with a firearm aiming system, the adjustment unit 710 can generate adjustment data during a flight time of a projectile fired from an associated firearm. For instance, subsequent to a bullet or other projectile being discharged, the adjustment unit 710 can track an in-flight trajectory of the projectile and generate, in real time, adjustment data to facilitate an aiming adjustment for the firearm while the projectile remains in flight. To this end, the adjustment unit 710 could utilize one or more machine learning (ML) algorithms or other techniques to rapidly facilitate an adjusted aiming point for the firearm prior to a time at which the tracked projectile makes impact. This can result in the ability to compensate a weapon aiming point for various conditions significantly faster than systems which track projectile impact points, as projectiles fired over long ranges (e.g., one or more kilometers) can take several seconds to make impact.

Figure 8:
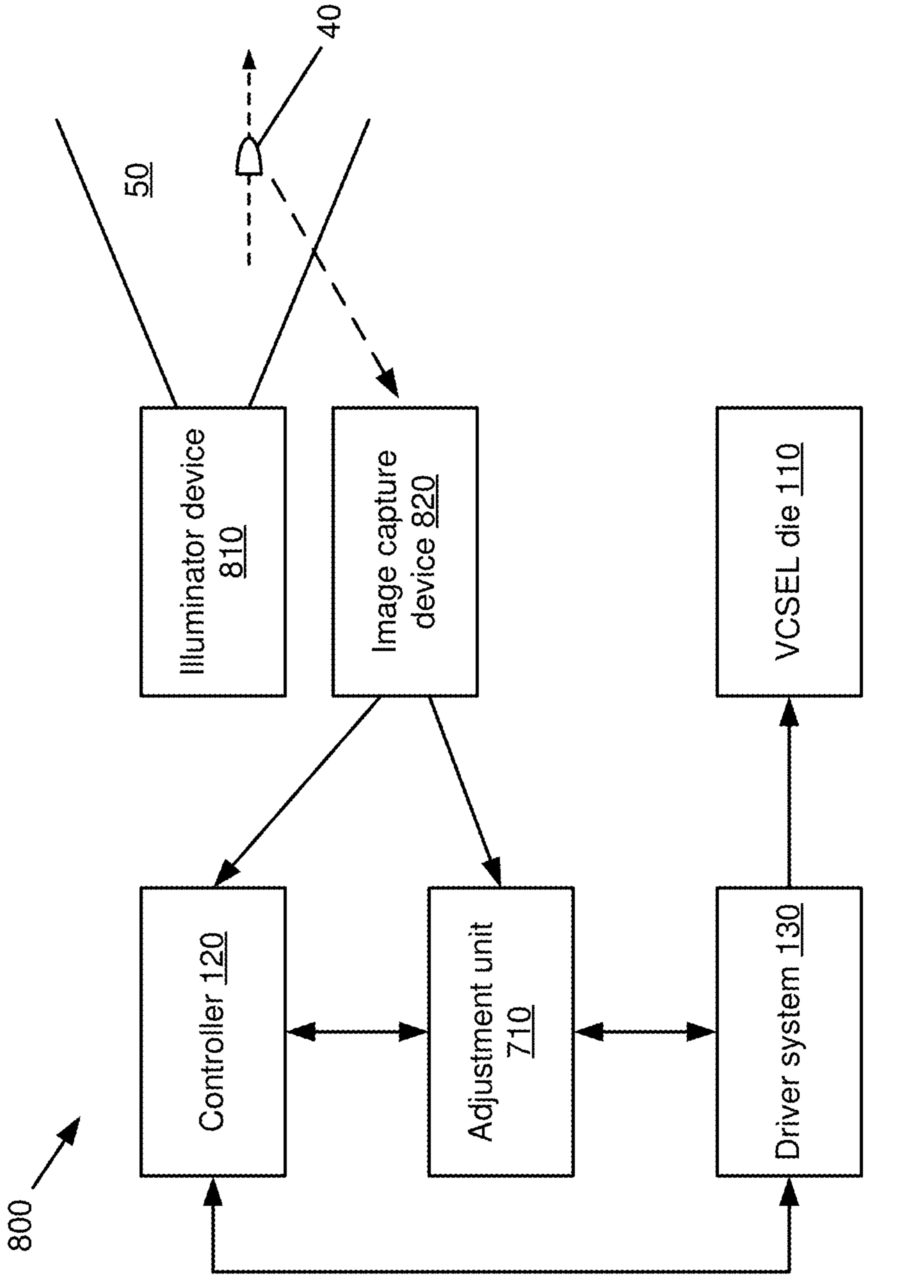
FIG. 8 is a block diagram of a system that facilitates adjustment of an aiming beam based on in-flight tracking of a discharged projectile in accordance with various implementations described herein.

Turning to FIG. 8, a system 800 that can be utilized to make real-time adjustments to a firearm aiming point based on tracking an in-flight projectile is illustrated. System 800 as shown in FIG. 8 includes a controller 120 and driver system 130 that can selectively drive elements of a VCSEL die 110 to project a reticle pattern for a firearm, e.g., as generally described above. System 800 additionally includes an adjustment unit 710 that can receive projectile trajectory data representative of a trajectory of a projectile 40 fired from the firearm to facilitate adjustment of the reticle. While the controller 120 and adjustment unit 710 are illustrated as separate components in FIG. 8, it is noted that, similar to the description above with respect to FIG. 7, the controller 120 and adjustment unit 710 could be implemented via a common component.

To facilitate the generation of projectile trajectory data, system 800 further includes an illuminator device 810 and an image capture device 820 that can facilitate collection of projectile image capture data representative of images of the projectile 40. More particularly, the illuminator device 810 can project an illumination beam 50 that illuminates a tail of the projectile 40 during flight, enabling images of the projectile 40 to be captured via the image capture device 820.

The illuminator device 810 can utilize any suitable technology for generating an illumination beam 50 sufficient for enabling image capture of the projectile 40. For instance, the illuminator device 810 could include one or more VCSEL or other laser sources, which could be combined with an optics system that includes lenses, diffuser elements, or other components to project an illumination beam 50 in a desired light wavelength. In other examples, the illuminator device 810 could be a flood light and/or other conventional light source. In still other examples, an illuminator device 810 may not be present or enabled, and the image capture device 820 could use ambient light to capture images of the projectile 40.

In some implementations, the illuminator device 810 can emit a constant illumination beam 50, e.g., to provide visible light for an operator of system 800. Alternatively, the illuminator device 810 can be controllable, e.g., via one or more buttons, knobs, or other control elements, to facilitate selective activation or deactivation of the illumination beam 50 or one or more properties of the illumination beam 50, such as brightness or the like. In other examples, the illuminator device 810 can activate automatically, e.g., in response to detecting a projectile discharge, to provide the illumination beam 50 for a defined amount of time before deactivating.

The image capture device 820 can be any suitable device that facilitates capturing images associated with a trajectory of in-flight objects such as the projectile 40. In some implementations, the image capture device can be a "high-speed" camera, e.g., that is capable of capturing images at a higher rate than a rate perceptible by humans without assistance. The image capture device 820 can be configured to feed captured image data back to the controller 120 and/or adjustment unit 710, which can analyze the data feed in real time or near-real time to facilitate adjustment of the reticle pattern projected from the VCSEL die 110 based on the tracked movement of the projectile 40 prior to its time of impact.

Figure 9:
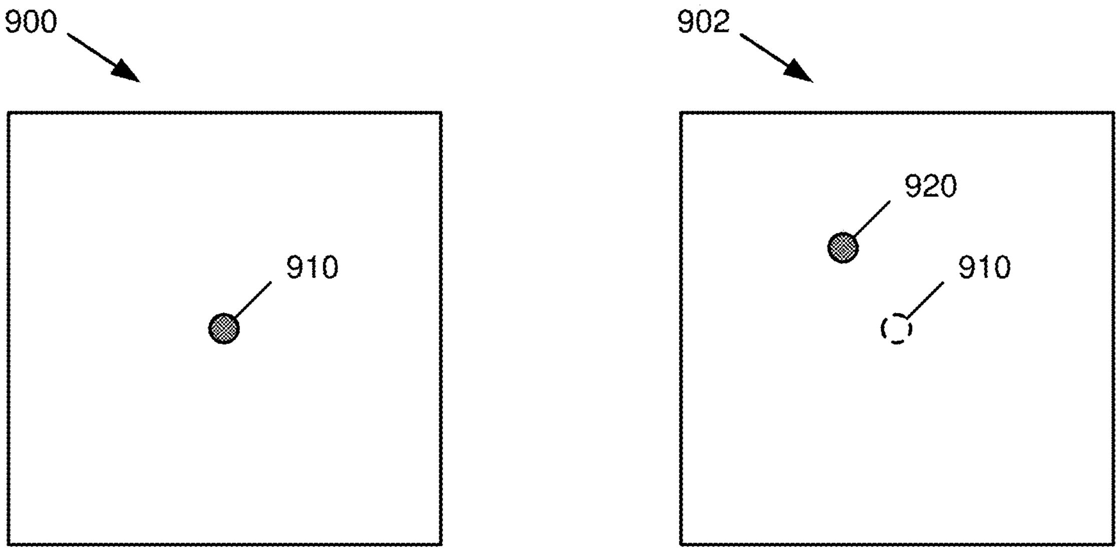
FIG. 9 is a diagram depicting an example display adjustment that can be performed for a projected reticle in accordance with various implementations described herein.

An example of an adjustment that can be performed for a weapon reticle pattern is illustrated by FIG. 9. Diagram 900 in FIG. 9 illustrates an initial state of the reticle pattern, here a dot reticle for simplicity, that indicates a zeroed aiming point 910 of an associated firearm. As further illustrated by diagram 902, based on one or more adjustments as determined via a controller 120 and/or an adjustment unit 710 as described above, the reticle pattern can be digitally shifted from the zeroed aiming point 910 of the firearm to an adjusted aiming point 920, e.g., to compensate for conditions altering a flight path of projectiles discharged from the firearm. By way of the example shown in diagram 902, a controller 120 and/or adjustment unit 710 can facilitate adjustment of the reticle pattern by deactivating a VCSEL element associated with the zeroed aiming point 910 and activating another VCSEL element associated with the adjusted aiming point 920.

Figure 10:
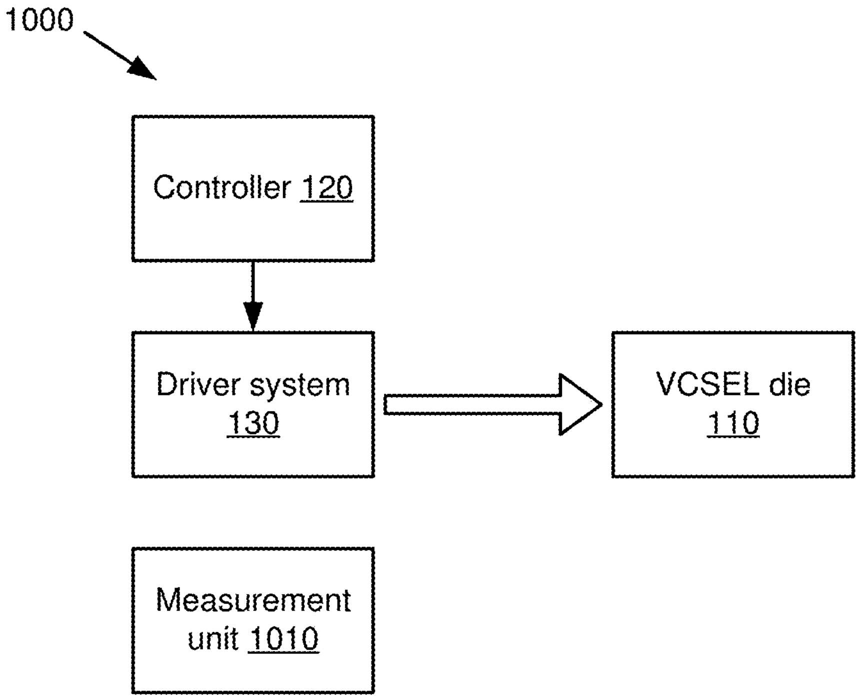
FIG. 10 is a block diagram of a system that facilitates measuring far-field objects using a VCSEL device in accordance with various implementations described herein.

With reference next to FIG. 10, a system 1000 that facilitates measuring far-field objects using a VCSEL device is illustrated. Repetitive description of like elements that are employed in other embodiments described herein is omitted for brevity. System 1000 as shown in FIG. 10 includes a controller 120 and a driver system 130 that can selectively drive elements of a VCSEL die 110 as generally described above. As further shown in FIG. 10, system 1000 also includes a measurement unit 1010 that can enable measurement of far-field objects with the aid of a pattern projected by the VCSEL die 110.

Figure 11:
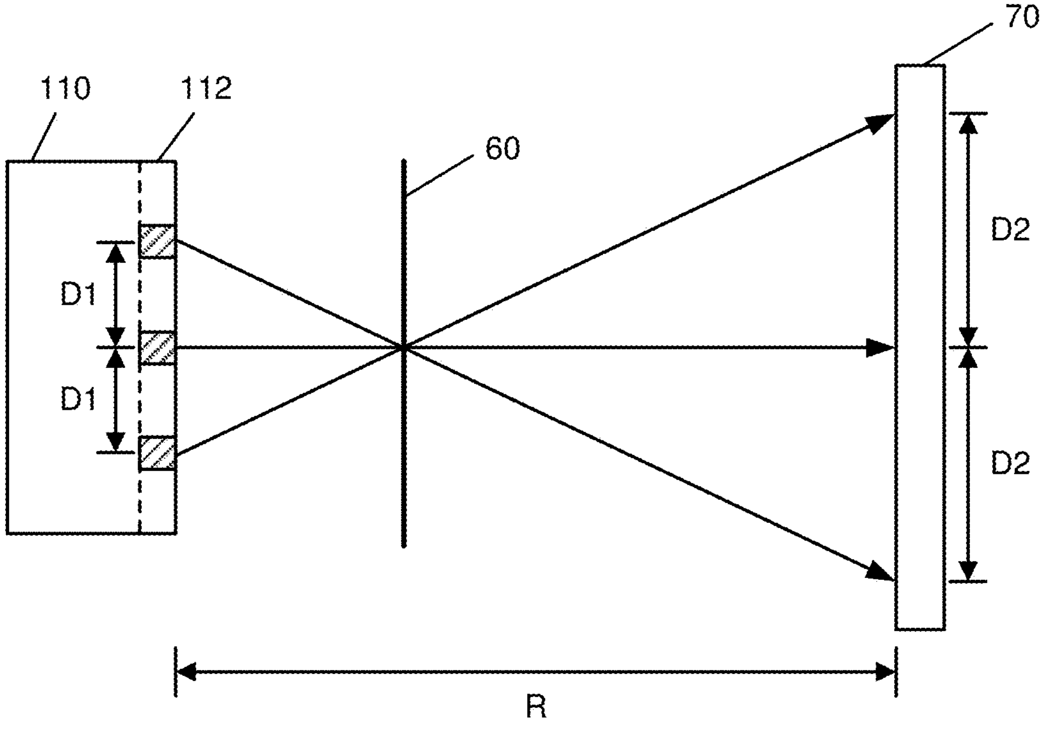
FIGS. 11-12 are diagrams depicting example techniques for measuring far-field objects using a VCSEL device in accordance with various implementations described herein.

FIG. 11 illustrates an example configuration of VCSEL elements that can facilitate measurement of far-field objects, e.g., by the measurement unit 1010 of system 1000. As shown by FIG. 11, respective lasing segments can be positioned on the emission surface 112 of the VCSEL die 110 such that selected VCSEL elements formed from those lasing segments are spaced apart from each other on the VCSEL die 110 by a first uniform distance, denoted in FIG. 11 as D1. This uniform spacing, coupled with collimating optics or other optical elements, such as a collimating lens 60 through which light emitted from the VCSEL element passes, can cause the angular spacing between beams projected from the VCSEL elements to remain the same as the beams are projected outwards. As a result, the resulting projected beams will appear on a far-field target surface 70 spaced apart by a second uniform distance, denoted in FIG. 11 as D2, where D2 is a function of D1, the range between the VCSEL die 110 and the target surface 70 (denoted in FIG. 11 as R), and the angular spacing of the beams projected from the VCSEL die 110.

In an implementation, the relationship between D1, D2, and R can be controlled by the focal length of the collimating lens 60 that is paired with the VCSEL die 110. By way of a specific, non-limiting example, the first distance D1 shown in FIG. 11 could be equal to approximately 25 microns, and the collimating lens 60 can have a focal length of 25 millimeters (i.e., D1×1000), resulting in a 1 milliradian angular spacing between projected beam components. As a result, distance D2 will be equal to approximately 1 meter at a range of 1 kilometer, approximately 2 meters at a range of 2 kilometers, and so on. Other ratios between D1 and lens focal length could also be used to facilitate alternate angular spacing.

Figure 12:
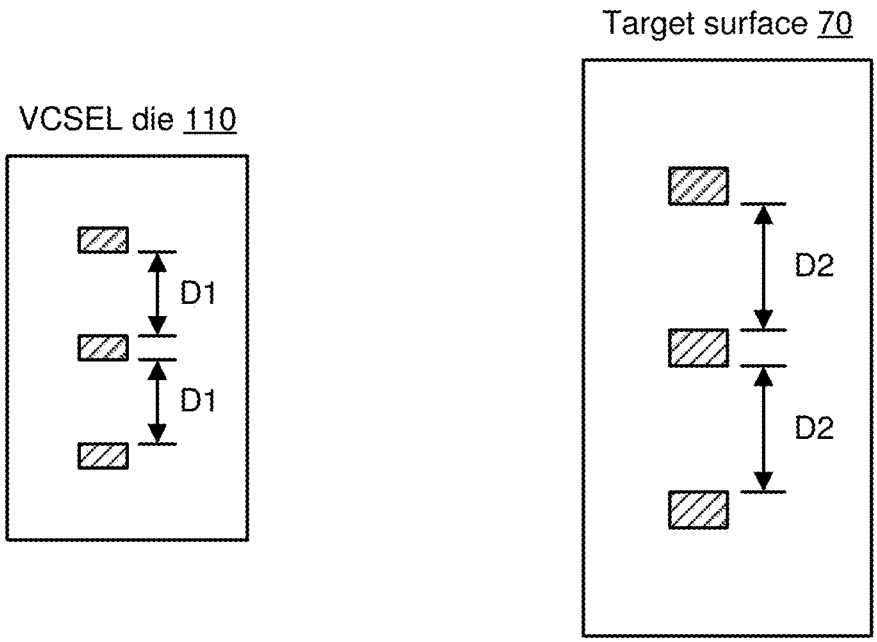

FIG. 12 illustrates front views of the example VCSEL die 110 and target surface 70 shown in FIG. 11. As shown in FIG. 12, respective selected VCSEL elements are spaced apart by a first distance D1, resulting in a projection pattern at the target surface 70 composed of projected objects spaced apart by a second distance D2. While rectangular VCSEL elements are shown in FIG. 12, it is noted that any other shape could also be used. Additionally, it is further noted that the VCSEL die 110 could include elements other than those shown in FIG. 12, e.g., elements not spaced apart by distance D1, and that these other elements could also be illuminated in addition to, or in place of, some or all of the elements shown in FIG. 12. In a case in which both regularly and irregularly spaced VCSEL elements are present, a measurement unit 1010 as shown in FIG. 10 and/or other components could facilitate measurement of far-field objects using the regularly spaced elements.

Returning now to FIG. 10, the measurement unit 1010 can, in response to a spatial pattern such as those shown in FIGS. 11-12 being projected onto a target surface 70, enable measurement of a size of the target based on one or more factors, such as the spacing of the VCSEL elements used for measurement on the VCSEL die 110, the spacing of objects projected from the VCSEL elements used for measurement onto the target surface 70, the distance between the VCSEL die 110 and the target surface 70, and/or other factors. Also or alternatively, the measurement unit 1010 could facilitate other types of target measurement, such as target movement speed (e.g., lateral speed, ground to air or air to ground speed, etc.) and/or other suitable measurements.

Figure 13:
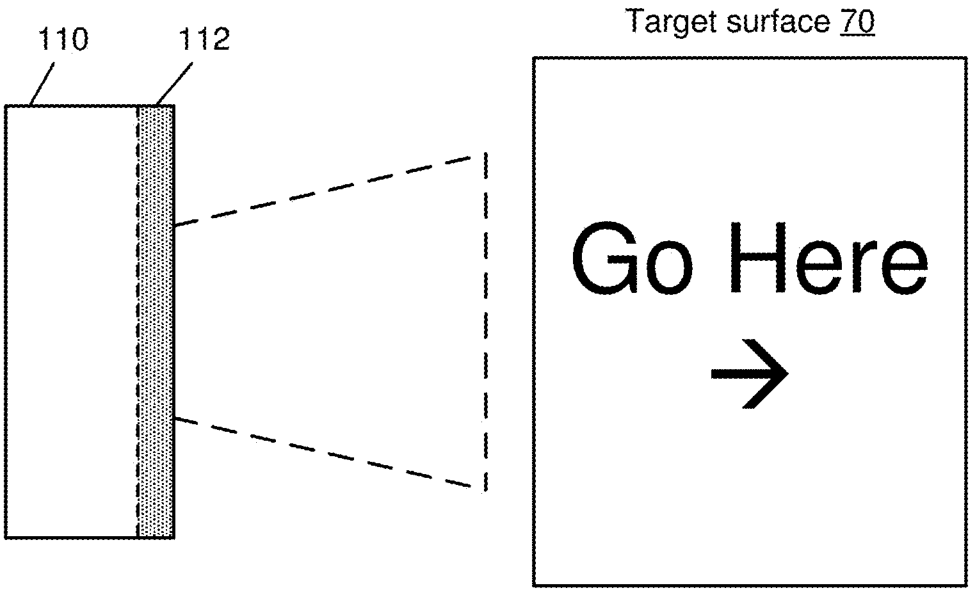
FIG. 13 is a diagram depicting projection of text using a VCSEL device in accordance with various implementations described herein.

Referring next to FIG. 13, a diagram depicting projection of text using a VCSEL device is provided. In the example shown by FIG. 13, one or more VCSEL elements on the emission surface 112 of a VCSEL die 110 can be selectively activated (e.g., by a controller 120 and/or driver system 130, not shown in FIG. 13) to facilitate projection of text, numbers, symbols, animations, and/or other desired static or animated patterns onto a target surface 70. In some implementations, a translator unit and/or other suitable devices could also be used in combination with the VCSEL die 110 to facilitate translation of a text message to be projected as shown in FIG. 13 into other languages, typefaces, etc., prior to being projected by the VCSEL die 110.

Figure 14:
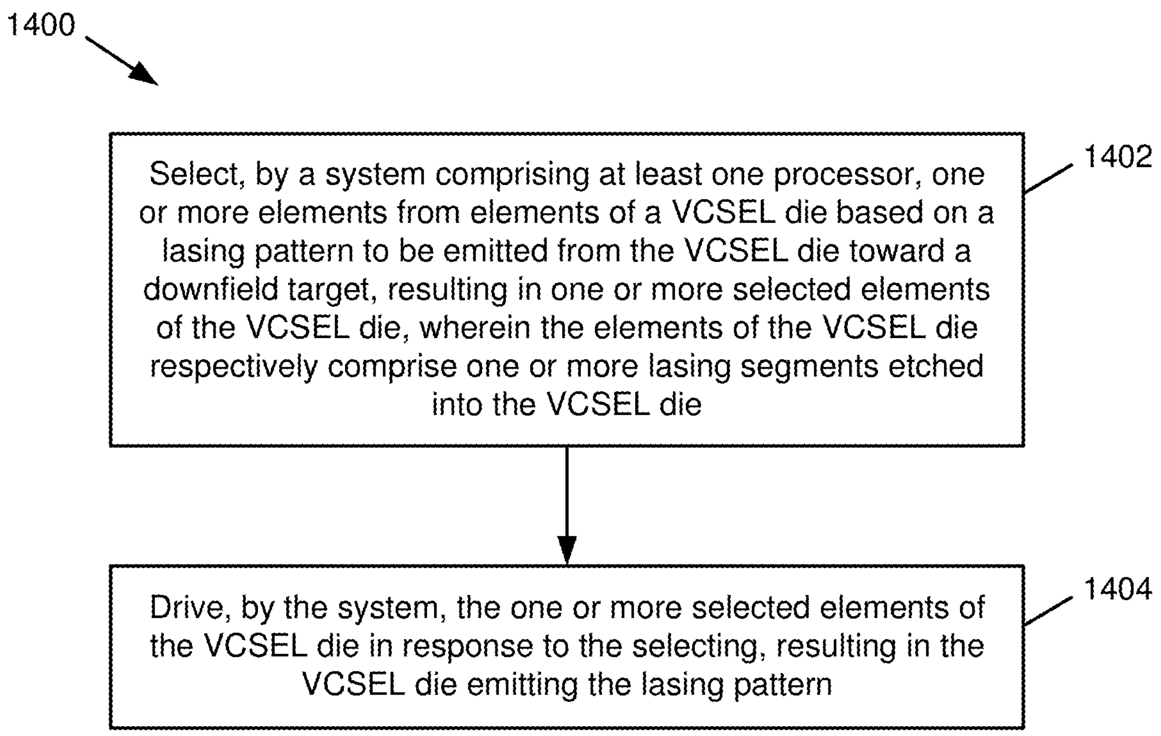
FIG. 14 is a flow diagram of a method that facilitates generation of aiming or pointing beams using a VCSEL device in accordance with various implementations described herein.

Turning to FIG. 14, a flow diagram of a method 1300 that facilitates generation of aiming or pointing beams using a VCSEL device is illustrated. At 1402, a system comprising at least one processor (e.g., a controller 120 and/or a processor 610) can select one or more elements from elements of a VCSEL die (e.g., a VCSEL die 110) based on a lasing pattern to be emitted from the VCSEL die toward a downfield target, resulting in one or more selected elements (e.g., elements 114) of the VCSEL die. The elements of the VCSEL die can respectively include one or more lasing segments that are etched into the VCSEL die.

At 1404, the system can drive (e.g., by a driver system 130 and/or a processor 610) the element(s) of the VCSEL die that were selected at 1402, resulting in the VCSEL die emitting the desired lasing pattern.

In one implementation of method 1400, the lasing pattern can comprise a reticle pattern that assists aiming of a firearm onto which the VCSEL die is mounted, and upon conclusion of method 1400 additional actions could be performed to facilitate adjustment of this reticle pattern, e.g., by selecting one or more alternate elements of the VCSEL die based on an updated lasing pattern representative of an adjusted aiming point of the firearm and then driving the newly selected element(s). In another implementation of method 1400, the lasing pattern can include uniformly spaced elements such as those described above with respect to FIGS. 10-12, and upon conclusion of method 1400 additional actions could be performed to measure a size or speed of a downfield target using the projected lasing patterns. Other implementations of method 1400 could also be used.

FIG. 14 as described above illustrates a method in accordance with certain embodiments of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc. The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

a vertical-cavity surface-emitting laser (VCSEL) die comprising individually addressable VCSEL elements, the individually addressable VCSEL elements respectively comprising one or more lasing segments etched into the VCSEL die;

a controller unit that designates a first selected VCSEL element, of the individually addressable VCSEL elements of the VCSEL die, based on a first spatial pattern to be projected from the system in a downfield direction toward a target, the first spatial pattern facilitating aiming of a firearm associated with the system; and a driver system that selectively applies a drive signal to the first selected VCSEL element in response to the first selected VCSEL element being designated by the controller unit, wherein the controller unit further designates a second selected VCSEL element, of the individually addressable VCSEL elements of the VCSEL die, based on a second spatial pattern representative of an adjusted aiming point of the firearm with reference to the target, and wherein the driver system selectively applies the drive signal to the second selected VCSEL element instead of the first selected VCSEL element in response to the second selected VCSEL element being designated by the controller unit.

2. The system of claim 1, wherein:

the first spatial pattern is representative of a zeroed aiming point of the firearm with reference to the target.

3. The system of claim 2, wherein the controller unit receives, from a wind sensor, data relating to a wind velocity, of wind present between the firearm and the target, and designates the second selected VCSEL element based on the zeroed aiming point of the firearm and the wind velocity.

4. The system of claim 2, wherein the controller unit receives, from a movement sensor, data representative of a movement speed of the target and designates the second selected VCSEL element based on the zeroed aiming point of the firearm and the movement speed of the target.

5. The system of claim 2, wherein the controller unit receives projectile trajectory data representative of a trajectory of a projectile discharged from the firearm, wherein the controller designates, prior to a time of impact of the projectile, the second selected VCSEL element based on the zeroed aiming point of the firearm and the projectile trajectory data.

6. The system of claim 5, wherein the projectile trajectory data comprises projectile image capture data representative of an image of the projectile captured during a flight time of the projectile, the projectile image capture data being a result of illumination of the projectile during the flight time of the projectile.

7. The system of claim 1, wherein the first spatial pattern is one of a group of spatial patterns, and wherein the first spatial pattern comprises a reticle pattern that assists the aiming of the firearm associated with the system.

8. The system of claim 7, wherein the group of spatial patterns further comprises a second reticle pattern that assists aiming of a secondary weapon.

9. The system of claim 1, wherein the controller unit designates selected VCSEL elements, comprising the first selected VCSEL element, and wherein the selected VCSEL elements are spaced apart from each other on the VCSEL die by a first uniform distance, resulting in the first spatial pattern to be projected from the system comprising projected elements that are spaced apart by a second uniform distance at the target, the second uniform distance being a function of at least the first uniform distance and a determined distance between the system and the target.

10. The system of claim 9, further comprising:

a measurement unit that, in response to the first spatial pattern being projected onto the target, enables measurement of a size of the target based on the first uniform distance and the determined distance between the system and the target.

11. The system of claim 1, wherein the first spatial pattern is representative of text to be projected from the system toward the target.

12. A method, comprising:

designating, via a controller device, a first elected vertical-cavity surface-emitting laser (VCSEL) element from individually addressable VCSEL elements of a VCSEL die based on a first lasing pattern to be projected from the VCSEL die in a downfield direction toward a target, the individually addressable elements of the VCSEL die respectively comprising one or more lasing segments etched into the VCSEL die, wherein the first lasing pattern facilitates aiming of a firearm onto which the VCSEL die is mounted;

applying, by a driver system, a drive signal to the first selected VCSEL element in response to the designating of the first selected VCSEL element by the controller device;

designating, by the controller device, a second selected VCSEL element based on a second lasing pattern representative of an adjusted aiming point of the firearm with reference to the target; and applying, by the driver system in response to the designating of the second selected VCSEL element, the drive signal to the second selected VCSEL element.

13. The method of claim 12, wherein the first lasing pattern comprises a reticle pattern that assists the aiming of the firearm.

14. The method of claim 12, wherein the first lasing pattern is representative of a zeroed aiming point of a firearm with reference to the target.

15. The method of claim 14, wherein the applying of the drive signal to the second selected VCSEL element is instead of applying the drive signal to the first selected VCSEL element.

16. The method of claim 12, wherein the first selected VCSEL element is one of a plurality of selected VCSEL elements comprising respective ones of the individually addressable elements of the VCSEL die that are positioned on the VCSEL die at first intervals of a first distance, resulting in the first lasing pattern comprising projected elements at a location of the target that are positioned at second intervals of a second distance, the second distance being a function of at least the first distance and a determined distance between the VCSEL die and the target, and wherein the method further comprises:

measuring, by the controller device in response to the first lasing pattern being projected onto the target, a size of the target based on the second distance and the determined distance between the VCSEL die and the target.

17. The method of claim 12, wherein the first lasing pattern is representative of a text message to be projected toward the target.

18. A non-transitory machine-readable medium comprising computer executable instructions that, when executed by at least one processor, facilitate performance of operations, the operations comprising:

designating a first selected vertical-cavity surface-emitting laser (VCSEL) element from individually addressable VCSEL elements of a VCSEL die based on a first lasing pattern to be projected from the VCSEL die in a downfield direction toward a target, the individually addressable elements of the VCSEL die respectively comprising one or more lasing segments etched into the VCSEL die, wherein the first lasing pattern facilitates aiming of a firearm onto which the VCSEL die is mounted;

causing a driver system to apply a drive signal to the first selected VCSEL element in response to the designating of the first selected VCSEL element;

designating a second selected VCSEL element based on a second lasing pattern representative of an adjusted aiming point of the firearm with reference to the target; and causing the driver system to apply the drive signal to the second selected VCSEL element in response to the designating of the second selected VCSEL element.

19. The non-transitory machine-readable medium of claim 18, wherein the first lasing pattern comprises a reticle pattern that assists the aiming of the firearm.

20. The non-transitory machine-readable medium of claim 18, wherein the first lasing pattern is representative of a zeroed aiming point of a firearm with reference to the target.

* * * * *